(12) United States Patent
Gerum

(10) Patent No.: US 8,793,995 B2
(45) Date of Patent: Aug. 5, 2014

(54) SYSTEMS FOR RECOVERING THE UNUSED ENERGY OF EXHAUST GAS OF AN INTERNAL COMBUSTION ENGINE AND CORRESPONDING METHODS

(75) Inventor: Eduard Gerum, Rosenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 427 days.

(21) Appl. No.: 12/686,107

(22) Filed: Jan. 12, 2010

(65) Prior Publication Data

US 2010/0139266 A1 Jun. 10, 2010

Related U.S. Application Data

(63) Continuation of application No. PCT/EP2008/005579, filed on Jul. 9, 2008.

(30) Foreign Application Priority Data

Jul. 19, 2007 (DE) .......................... 10 2007 033 693

(51) Int. Cl.
*F02D 23/00* (2006.01)
*F02B 33/44* (2006.01)

(52) U.S. Cl.
USPC ................ 60/602; 60/605.1; 60/606; 60/607; 60/612

(58) Field of Classification Search
USPC .......................... 60/602, 605.1, 606–609, 612
See application file for complete search history.

(56) References Cited

U.S. PATENT DOCUMENTS

| 4,163,367 | A | * | 8/1979 | Yeh | ................................. 60/414 |
| 4,196,587 | A | * | 4/1980 | Shiber | ............................ 60/414 |
| 5,064,423 | A | | 11/1991 | Lorenz et al. | |
| 5,156,000 | A | * | 10/1992 | Mallofre | ......................... 60/612 |
| 5,819,538 | A | * | 10/1998 | Lawson, Jr. | ..................... 60/611 |
| 2005/0079951 | A1 | | 4/2005 | Gonzalez Mena | |
| 2007/0246008 | A1 | | 10/2007 | Gerum | |

FOREIGN PATENT DOCUMENTS

| DE | 38 19 646 A1 | 12/1988 | |
| DE | 39 06 312 C1 | 12/1989 | |
| DE | 198 37 571 A1 | 3/1998 | |
| DE | 19637571 A1 * | 3/1998 | ............. F02B 21/00 |
| DE | 10 2004 047 975 A1 | 4/2006 | |
| EP | 0 645 272 A1 | 3/1995 | |
| EP | 1 481 833 A1 | 12/2004 | |
| JP | 63-45420 A | 2/1988 | |

OTHER PUBLICATIONS

International Search Report dated Dec. 12, 2008 with English translation (four (4) pages).
German Office Action dated Apr. 25, 2008 with English translation (twelve (12) pages).

* cited by examiner

*Primary Examiner* — Mary A Davis
(74) *Attorney, Agent, or Firm* — Crowell & Moring LLP

(57) ABSTRACT

A system and method for recovering the unused energy of exhaust gas of an internal combustion engine is provided. A charge device for generating compressed intake air for the internal combustion engine is driven by exhaust gas, and an air compressor having at least one compression stage is connected to the charge device to withdraw at least a partial quantity of the compressed intake air, the partial quantity of the compressed intake air of the charge device that can be withdrawn by the air compressor is adjustable.

15 Claims, 4 Drawing Sheets

SYSTEMS FOR RECOVERING THE UNUSED ENERGY OF EXHAUST GAS OF AN INTERNAL COMBUSTION ENGINE AND CORRESPONDING METHODS

CROSS-REFERENCE TO RELATED APPLICATIONS

This application is a continuation of PCT International Application No. PCT/EP2008/005579, filed Jul. 9, 2008, which claims priority under 35 U.S.C. §119 to German Patent Application No. DE 10 2007 033 693.6, filed Jul. 19, 2007, the entire disclosures of which are herein expressly incorporated by reference.

BACKGROUND AND SUMMARY OF THE INVENTION

The invention relates to arrangements and methods for recovering unused energy from the exhaust gas of an internal combustion engine.

Internal combustion engines such as, for example, spark-ignition and diesel engines often have charging for reasons of power-to-weight ratio and efficiency. Here, so-called turbochargers or exhaust-gas turbochargers are widely used. In these, exhaust gas of the engine is conducted into the turbocharger to its turbine, which drives a turbocharger-compressor wheel. The turbocharger-compressor wheel compresses the intake air for the engine to an optimum value and conducts said intake air to the engine via the inlet valve either as air or else as a fuel/air mixture.

The exhaust-gas turbocharger and the associated internal combustion engine must be adapted to one another with regard to the characteristic curves for the delivery capacity of air and pressure of the compressed air. In particular during acceleration, when a large air quantity and a high pressure are required, an overdimensioned turbocharger is advantageous. On the other hand, an excessively high pressure and an excessively high delivery rate may be too high for example during steady-state operation of the engine and at the start of an overrun mode in a vehicle engine, as a result of which the efficiency of the turbocharger/internal combustion engine combination is reduced.

One solution for this situation is a turbocharger with a variable geometry, which is also referred to with the abbreviation VTG. Here, stationary guide wheels upstream of the exhaust-gas turbine are designed so as to be adjustable in order to provide adaptation to different conditions. A disadvantage here is that, in the steady-state situation, greater flow losses are generated by the adjusting mechanism with the result of a pressure drop, which can lead to an increased fuel consumption.

A further solution is a bypass valve which is also referred to as a wastegate. Said valve prevents the engine from being acted on with an excessively high charge pressure and prevents the turbocharger from accelerating into an excessively high rotational speed range. The wastegate is a valve which is arranged in the exhaust-gas flow upstream of the turbine and which opens under certain operating conditions and, in the form of a bypass, conducts a part of the exhaust gas directly into the exhaust pipe while bypassing the exhaust-gas turbine. The problems for the engine and turbocharger with regard to overloading are thereby solved. However, the disadvantage of a not inconsiderable energy loss, and therefore a reduced efficiency of the internal combustion engine, remains.

It is also known to extract air from the engine on the charge-air side of the turbocharger between the outlet of the turbocharger-compressor turbine and the inlet of the engine in certain operating states. This may take place for example by means of a charged air compressor, such as for example for a compressor for providing compressed air for a service brake. Here, however, an air quantity of the compressed air is branched off from the charge-air circuit of the engine, which may have an excessively low delivery capacity and is not adapted to the operating states of the engine and the turbocharger.

It is therefore an object of the present invention to create an arrangement for recovering the energy of exhaust gas of an internal combustion engine which no longer has the disadvantages specified above and which offers a higher efficiency in terms of fuel utilization.

The basic concept of the invention is adjustment of the quantity of the compressed intake air of a turbocharger device that can be extracted by an air compressor.

In this way, a wastegate valve can be considerably reduced in size or dispensed with entirely. The energy which escapes together with the exhaust gas through the wastegate valve, which energy was previously present in the unburned fuel, is recovered to a large extent and may be stored in a suitable way, as a result of which said energy can be accessed to a certain extent. Such accessing may increase the efficiency of the internal combustion engine by virtue of the stored energy being conducted back to the machine, for example in order to assist the engine in certain operating states, such as for example during starting.

Furthermore, an adjustable extraction of compressed intake air enables more precise setting of the turbocharger/engine combination, with the increased efficiency resulting in better economy.

In one preferred embodiment, it is provided that the partial quantity of the compressed intake air can be adjusted as a function of at least one operating parameter of the internal combustion engine and/or of at least one operating parameter of the turbocharger device. Here, it is possible to take the operating state both of the engine and also of the turbocharger into consideration in the extraction quantity of the partial quantity of compressed air, with it being possible in every operating state of the engine and of the turbocharger to obtain an optimum action of said combination. The operating states of the engine and of the turbocharger device are available in the form of parameters on the basis of measured values of sensors of already-existing engine controllers, such that no additional installations are required for this purpose.

In a further embodiment, it is provided that the partial quantity of the compressed intake air can be adjusted by a controllable extraction valve. For example, by an opening angle of a valve of said type, it is easily possible to adjust the partial quantity by simple electrical control impulses or voltages. Such valves are available commercially, cheaply and in high quality on the market.

In addition to or instead of said extraction valve, it is provided in an alternative embodiment that the extractable partial quantity of the compressed intake air can be adjusted by adjusting an intake quantity of the air compressor. For this purpose, use is made of a compressor with a relatively high power, which provides a higher compression pressure than present compressors. The air compressor is advantageously used for providing compressed air for a service brake. It may however also be an assembly, which is driven with assistance from the extracted air, in a vehicle, such as for example a fan for an air-conditioning system or the like.

If the air compressor is designed such that it can be driven in a controllable fashion in order to adjust the intake quantity, it is additionally possible to attain a finer gradation of the extracted partial quantity of the compressed intake air. This may take place by an electric drive of the air compressor and/or by a coupling to the internal combustion engine. Here, the coupling is for example advantageously switchable, as is the case with a clutch.

In an alternative embodiment, the air compressor may have at least one control valve for adjusting the intake quantity. The air compressor may for example be a radial compressor or piston compressor. Its valves may be designed as control valves and adjust the partial quantity of compressed air according to the operating state and requirement. The air compressor may however also have a plurality of compressor stages, cylinders or turbines which, depending on the requirement, may be activated or deactivated by control valves in order to extract the partial quantity of the compressed air of the turbocharger. It is also possible for this purpose to use the existing valves in a piston compressor, or said valves may be modified in a suitable way.

Since the air extracted from the air compressor is compressed and therefore has a certain energy quantity which was previously stored in the exhaust gas, said energy which is transmitted to the compressed air may also be used to assist the drive of the air compressor (or of the respective assembly).

It is also provided in one embodiment that the air compressor is connected to at least one air storage tank for storing the partial quantity of the compressed intake air. The partial quantity of compressed air extracted by the air compressor can be compressed further by the latter and conducted into a store, where it is for example added to the compressed air for a service brake. The partial quantity may however also be stored in a separate tank, from which it can then be accessed for different purposes (for example via certain valves and drive circuits for ventilation drive purposes or the like).

If the air compressor is of reversible design such that it can be driven by compressed air stored in the at least one air storage tank, the air compressor can operate as a motor and the exhaust-gas energy of the internal combustion engine stored in the air can be provided for assistance, such as for example during starting or in certain operating states such as driving on a flat surface.

For this purpose, the air compressor is coupled to the internal combustion engine, for example by means of a clutch. This coupling serves both for introducing a torque from the air compressor, which is driven by the stored air, into the internal combustion engine, and also for introducing a torque from the internal combustion engine into the air compressor in order to drive the latter in certain operating states.

In one embodiment, it is preferably provided that the arrangement has a control device for controlling the adjustable partial quantity of the compressed intake air. Said controller performs all the adjustments of operating parameters and characteristic maps of the internal combustion engine and of the motor which are stored for example in table form in memory devices. Said controller controls the respective valves and can then calculate, on the basis of the operating characteristic curve of the air compressor, what partial quantity of compressed air is/was extracted, and can provide said data to the superordinate engine control device, as a result of which the overall efficiency can be optimized. It is also possible here, taking into consideration the driver demand and the characteristic map of the engine and turbocharger, to calculate what exhaust-gas quantity will be produced during the next few charging cycles.

It is advantageous for the control device to be a constituent part of a control device of the internal combustion engine. This reduces the number of parts and the space requirement of components.

In an alternative embodiment, it is provided that the air compressor is designed as an intelligent air compressor with a separate control device. The latter may communicate with an existing engine controller for example via a bus within the vehicle. In the case in which the air compressor may form both an air motor and also a compressor, an intelligent compressor of said type is particularly advantageous. Here, it is for example possible for additional valves to be dispensed with, since these are already integrated in said air compressor. It is therefore merely necessary, for example, for the respective ports to be connected to the air tank and to the air line.

Here, it is also possible for the air compressor to be used, in one operating state, as an additional engine brake. For this purpose, the coupling to the internal combustion engine is activated, with for example the valves of the air compressor being closed, and said air compressor performing only compression work.

In a further alternative embodiment, the arrangement has an exhaust-gas compressor which is connected to an exhaust line of the internal combustion engine and which can be driven by the exhaust gas and which can be coupled to the internal combustion engine and/or is designed as an air compressor. Here, use is advantageously still made of energy of the exhaust gas in that the exhaust-gas compressor which is driven by the exhaust gas, as an air motor, generates a torque which, in order to assist the torque of the internal combustion engine, is conducted to the latter via a clutch. It is also possible for the compressor which is driven by the exhaust gas to operate as a further air compressor, compressing additional air and supplying said air to the air stores of the vehicle.

The exhaust-gas compressor can be controlled by means of at least one valve. It may also be designed as an intelligent compressor. It is of course also possible for the exhaust-gas compressor to be used as an additional engine brake by virtue of said exhaust-gas compressor being coupled to the internal combustion engine and performing compression work.

In yet a further embodiment, it is provided that the turbocharger device is connected to a secondary air supply device for the controlled supply of at least a partial quantity of compressed stored secondary air. It is thereby advantageously possible firstly to eliminate a so-called turbo lag and secondly to provide a further engine braking function. The engine braking function is obtained in that, in the engine braking state, the internal combustion engine compresses the supplied secondary air in addition to the intake air.

A further alternative design provides an arrangement for recovering energy from the exhaust gas of an internal combustion engine, which has the following:

a turbocharger device, which is driven by the exhaust gas, for generating compressed intake air for the internal combustion engine;

a first air motor which can be driven by stored compressed air and/or compressed intake air of the turbocharger device in order to generate a torque and which can be coupled to the internal combustion engine for a transmission of torque; and/or a second air motor which can be driven by stored compressed air and/or exhaust gas of the internal combustion engine in order to generate a torque and which can be coupled to the internal combustion engine for a transmission of torque.

Here, it is preferable for the first air motor to be a reversible air compressor and for the second air motor to be a reversible exhaust-gas compressor. In each case two functions, specifically the compression of air and drive by means of air or exhaust gas, are therefore advantageously contained in one functional unit.

An internal combustion engine has the above-described arrangement for recovering energy from the exhaust gas of the internal combustion engine.

Other objects, advantages and novel features of the present invention will become apparent from the following detailed description of one or more preferred embodiments when considered in conjunction with the accompanying drawings.

BRIEF DESCRIPTION OF THE DRAWINGS

The same reference symbols are used to denote identical or similar elements with identical or similar functions.

DETAILED DESCRIPTION OF THE DRAWINGS

Figure 1:
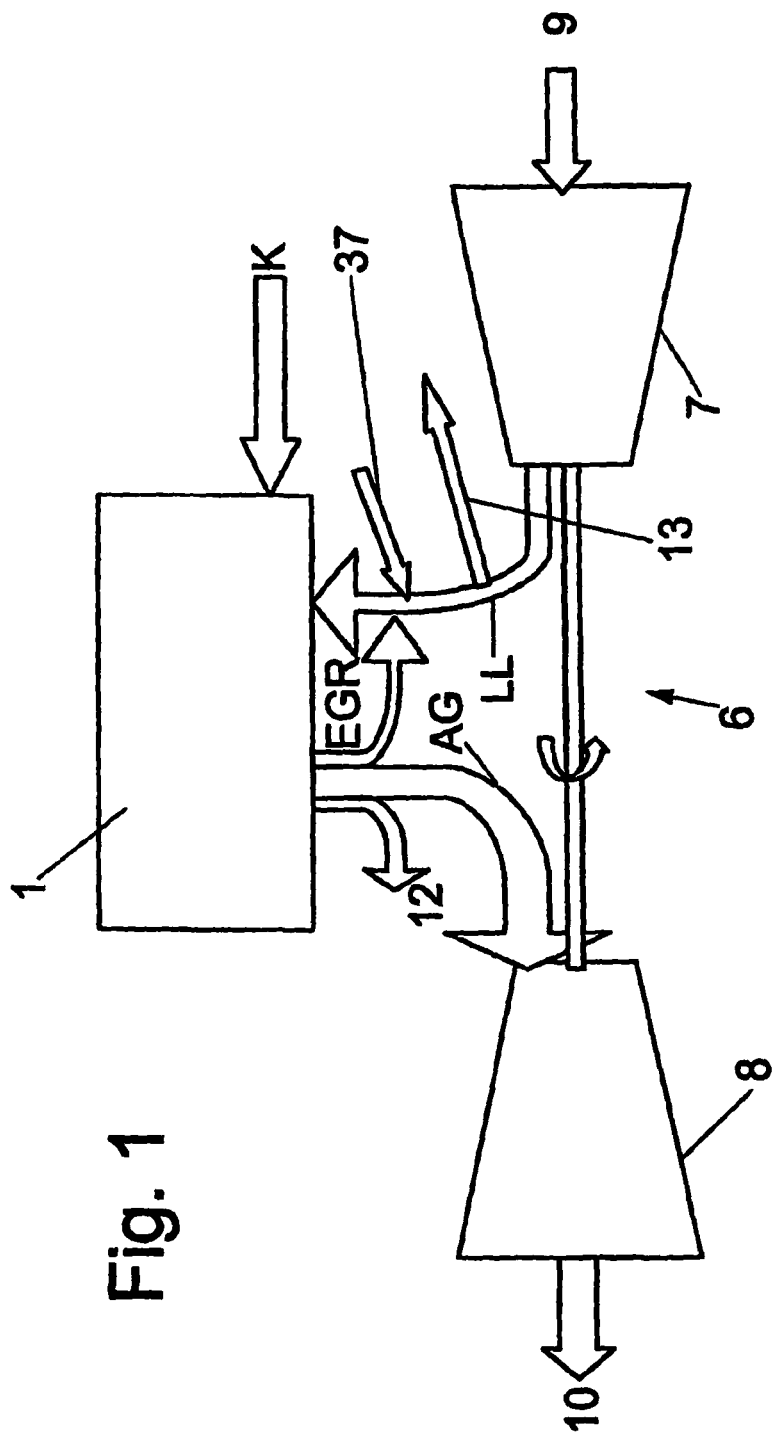
FIG. 1 shows a block diagram of the energy flow in a first exemplary embodiment of an arrangement according to the invention.

FIG. 1 shows a block diagram of the energy flow in a first exemplary embodiment of an arrangement according to the invention. An internal combustion engine 1 is supplied with fuel K. Air via a first intake line 9 is required for the combustion of the fuel K, which air, having been compressed by a turbocharger-compressor turbine 7 of a turbocharger device 6, is supplied to the internal combustion engine 1 via a charge-air line LL. The exhaust gases 10 generated in the internal combustion engine 1 during the combustion are conducted through an exhaust line AG into an exhaust-gas turbine 8 of the turbocharger device 6 and, there, exert a part of their energy for the compression of the intake air. A part of the exhaust gases is supplied to the intake air via exhaust-gas recirculation EGR. A further part of the exhaust gases escapes via a bypass line 12.

The energy contained in the compressed intake air downstream of the turbocharger-compressor turbine 7 is extracted via an extraction line 13, as is described in more detail further below. Secondary air can be added to the intake air by means of a secondary air line 37.

Figure 2:
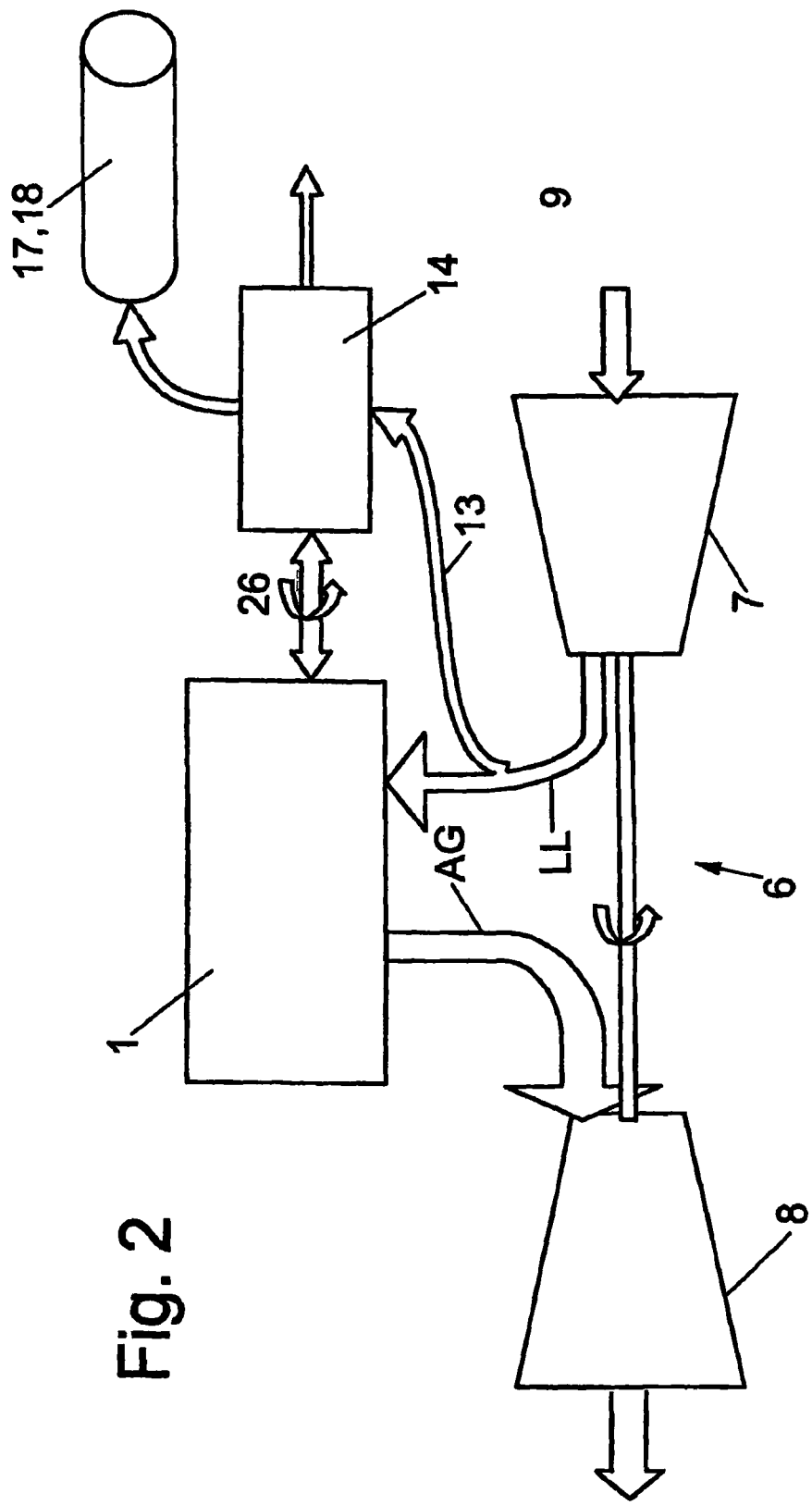
FIG. 2 shows a block diagram of the energy flow in a second exemplary embodiment of the arrangement according to the invention.

FIG. 2 shows a block diagram of the energy flow in a second exemplary embodiment of the arrangement according to the invention. Here, the extraction line 13 is connected to an air compressor 14 which is coupled to the internal combustion engine 1 by means of a clutch device 26 and is connected to an air storage tank 17, 18. The energy of the extracted intake air drives the air compressor 14 in such a way that it, as an air motor, generates a torque which is transmitted by means of the clutch device 26 to the internal combustion engine, and/or compresses air which is stored in the air storage tank 17. Excess air can escape into the atmosphere AT.

Figure 3:
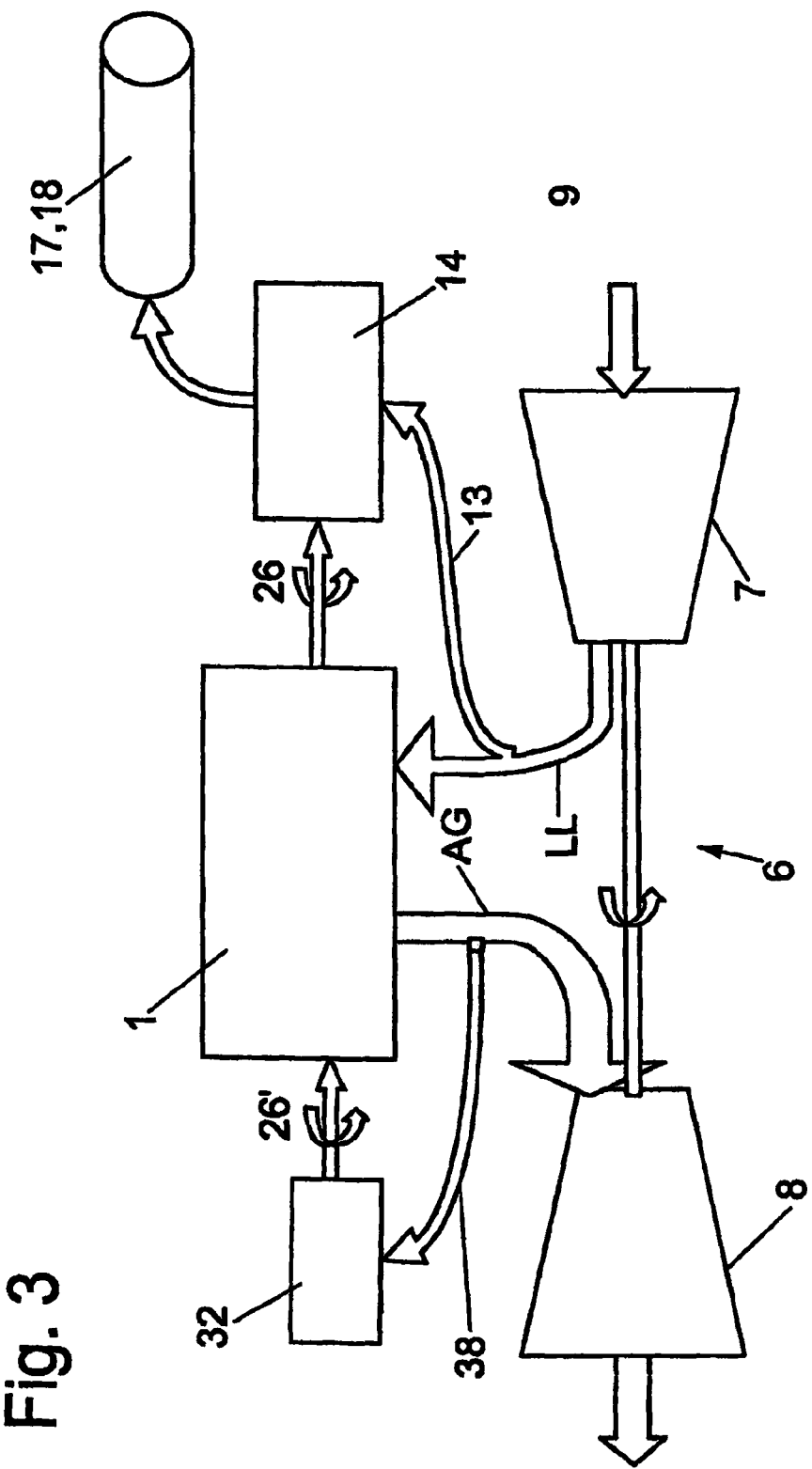
FIG. 3 shows a block diagram of the energy flow in a third exemplary embodiment of the arrangement according to the invention.

Finally, FIG. 3 shows a block diagram of the energy flow in a third exemplary embodiment of the arrangement according to the invention, which corresponds to the second exemplary embodiment according to FIG. 2 and which additionally has a further air motor in the form of an exhaust-gas compressor 32. Said exhaust-gas compressor 32 is driven by a part of the exhaust-gas flow via an exhaust-gas extraction line 38 and generates a torque which can be transmitted to the internal combustion engine 1 by means of a further clutch device 26'.

Figure 4:
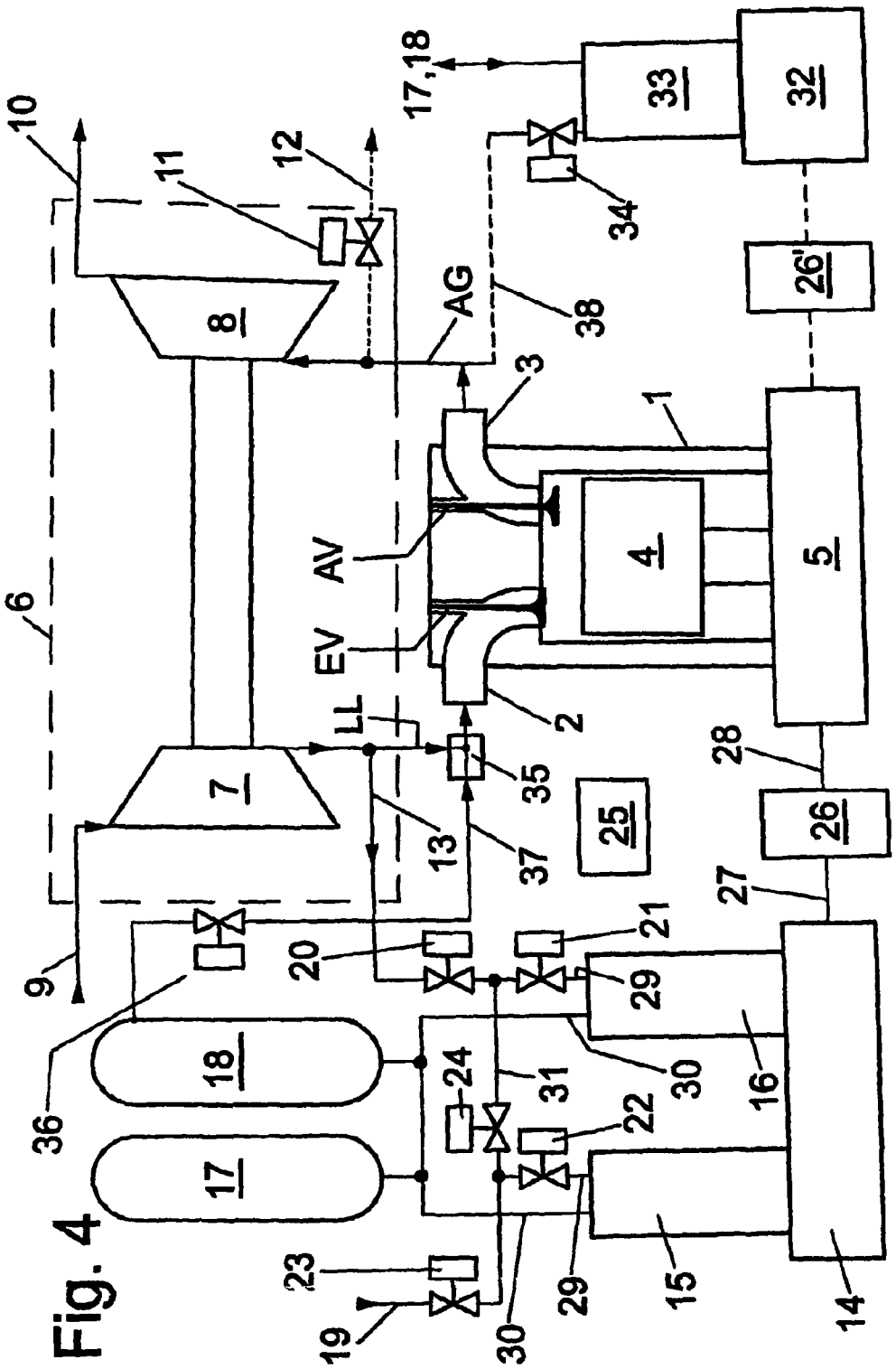
FIG. 4 shows a detailed block diagram of a fourth exemplary embodiment of the arrangement according to the invention.

FIG. 4 illustrates a detailed fourth exemplary embodiment encompassing the first to third exemplary embodiments according to FIGS. 1 to 3.

The internal combustion engine 1, in this example an engine which is illustrated only schematically with a piston 4 in a cylinder, with an inlet valve EV, with an outlet valve AV and with a crankcase 5, is connected to the turbocharger device 6. In this example, the turbocharger device 6 is an exhaust-gas turbocharger whose exhaust-gas turbine 8 is connected to an outlet line 3 of the engine and whose turbocharger-compressor turbine 7 is connected to an inlet line 2 of the engine.

The turbocharger-compressor turbine 7 and the exhaust-gas turbine 8 are rotationally fixedly coupled to one another on a shaft. The exhaust-gas turbine 8 is driven by the exhaust gas AG from the outlet 3 of the engine and, here, rotates the turbocharger-compressor turbine 7 which sucks in air via the first intake line 9, compresses said air and forces it via the charge-air line LL into the inlet 2 of the engine.

The bypass line 12 is indicated as a dashed line with a bypass valve 11 between the outlet 3 of the engine and the inlet of the exhaust-gas turbine 8. The bypass valve 11 is a so-called wastegate valve which, in the application of the invention, may be of very small design or even dispensed with. The function of said bypass valve 11 has already been explained in the introduction and will not be repeated here.

Between the inlet 2 of the engine and the outlet of the compressor turbine 7, an extraction line 13 is connected with one end to the charge line LL and with another end to an extraction valve 20. The extraction valve 20 is connected to a first control valve 21, and, in this example, via a connecting line 31 to a fourth control valve 24. The first control valve 21 is connected to a first port 29 of a second compressor cylinder 16 of an air compressor 14. The fourth control valve 24 is connected to a second control valve 22 and to a third control valve 23. The second control valve 22 is connected to the first port 29 of a first compressor cylinder 15 of the air compressor 14. The third control valve 23 is connected to a second intake line 19 for air.

Each compressor cylinder 15, 16 has a second port 30 which is connected to a first and a second air storage tank 17 and 18.

In this example, the air compressor 14 is an air compressor for compressed air for a service brake of a vehicle (not shown). Here, said air compressor 14 has a compressor drive 27 which is coupled by a clutch device 26 to a drive output of the internal combustion engine 1. The clutch device 26 is preferably electrically controllable.

A control device 25 is indicated merely schematically as a block and is connected to the control valves 11, 20 to 24, to the clutch device 26 and to a superordinate engine controller (not shown) and also to several sensors (not illustrated) for detecting the operating states of the internal combustion engine 1 and turbocharger device 6.

The control device 25 and the valves 20-24 may also be integrated in the air compressor 14, which thereby forms a so-called intelligent compressor.

The control device 25 also has characteristic curve values of the internal combustion engine 1 and of the turbocharger device 6 stored in memory devices. On the basis of said characteristic curve values and the sensor values, said control device 25 is capable of adjusting the controllable components 11, 20 to 24, 26, which are connected thereto, in such a way that the compressed intake air from the compressor turbine 7 is extracted in the desired partial quantity from the charge-air line LL via the extraction valve 20 and the first control valve 21 into the second compressor cylinder 16 in a certain operating state of the internal combustion engine 1 and of the turbocharger device 6. The control device 25 can calculate said partial quantity on the basis of the stored table values and provide said partial quantity to the superordinate engine control device.

In a first stage, as an example, the control device 25 opens the extraction valve 20 by a certain value, opens the first control valve 21 and leaves the second to fourth control valves 22 to 24 closed.

The extracted partial quantity of compressed intake air is compressed further in the second compressor cylinder 16 and is delivered into the air storage tanks 17, 18.

To increase the extracted quantity, the control device 25 can firstly further open the extraction valve 20 (assuming the latter is an adjustable valve) and then open the fourth control valve 24 and the second control valve 22 such that the first compressor cylinder 15 is also available for the extraction of the compressed intake air from the charge-air line LL, and compresses said compressed intake air further, as described for second compressor cylinder 16.

If no extraction of air from the charge-air line LL is taking place, the air compressor 14 can intake air from the second intake line via the third control valve 23 and compress said intake air for the service brake into the air storage tanks 17, 18. This may take place either only by the first compressor cylinder 15 (control valves 20, 21 and 24 closed and control valves 23 and 22 open) or by both compressor cylinders 15 and 16 (control valve 20 and control valves 21, 22, 23 and 24 open).

A situation is also possible in which the air compressor 14 feeds air out of the second intake line 19 by means of the first compressor cylinder 15 and extracts compressed air from the charge-air line LL by means of the second compressor cylinder 16. Here, the control valves are in the following state: 20 to 23 open and 24 closed. The compressed air flowing into the second compressor cylinder 16 from the charge-air line LL can, by the energy already stored therein, assist the drive of the air compressor 14.

By the control device 25 and the arrangement according to the invention, it is possible to increase the efficiency of the internal combustion engine 1 by virtue of the energy stored in the exhaust gas 10 being extracted in the compressed charge air by the air compressor 14 in a targeted and therefore controlled manner as a function of the operating state of the engine and of the turbocharger device 6.

The invention is not restricted to the exemplary embodiment explained but rather may be modified in a wide range within the scope of the appended claims.

It is also possible for the air compressor 14 to have only one compressor cylinder or more than two, which can then be connected in series in stages, or connected in parallel, by means of further control valves.

The air compressor 14 can also function as a motor by virtue of the compressed air which is stored in the air storage tanks 17, 18 being utilized to drive said air compressor 14, with the valves (not shown) of said air compressor 14 being controlled correspondingly. Here, the drive of said air compressor 14 acts as a torque via the compressor drive input (shaft), the clutch device 26 and the drive output 28 to the internal combustion engine 1. This may for example have an assisting action in certain operating states of the engine or may act for starting or for starting assistance.

The air compressor 14 may also be a radial compressor.

It is also conceivable for the air compressor 14 to be charged by the compressed air from the charge line LL in order to assist the compression of the compressed air for the service brake.

Furthermore, the air compressor 14 may also serve as a drive for various assemblies in a vehicle, such as for example fans.

The air storage tanks 17, 18 may also be connected separately from one another to the air compressor 14.

In an alternative embodiment, a further compressor in the form of an exhaust-gas compressor 32 is provided, which can likewise be coupled to the internal combustion engine 1 by a further clutch device 26' (shown in dashed lines). In said example, the exhaust-gas compressor 32 has one exhaust-gas compressor cylinder 33. A plurality is of course also possible. The exhaust-gas compressor cylinder 33 is connected via an exhaust-gas valve 34 to the exhaust line AG for the drive of the exhaust-gas compressor 32 by means of exhaust gas. The exhaust-gas compressor 32 may also be used for compressing further air, which it can supply to the air storage tanks 17, 18. It is also possible for the exhaust-gas compressor 32 to be driven by the air stored in the air storage tanks 17, 18.

Furthermore, the charge-air line LL is provided with a secondary air supply device 35 which, in this example, is connected by a secondary air valve 36 to the air storage tank 18. It is hereby possible to supply additional air to the internal combustion engine 1 for example in order to eliminate so-called turbo lag or, in the engine braking operating state, to increase the efficiency of the engine brake by virtue of additional air being compressed by the internal combustion engine 1.

LIST OF REFERENCE SYMBOLS

1 Internal combustion engine
2 Inlet line
3 Outlet line
4 Piston
5 Crankcase
6 Turbocharger device
7 Turbocharger-compressor turbine
8 Exhaust-gas turbine
9 First intake line
10 Exhaust gas
11 Bypass valve
12 Bypass line
13 Extraction line
14 Air compressor
15 First compressor cylinder
16 Second compressor cylinder
17 First air storage tank
18 Second air storage tank
19 Second intake line
20 Extraction valve
21 First control valve
22 Second control valve
23 Third control valve
24 Fourth control valve
25 Control device
26, 26' Clutch device
27 Compressor drive
28 Drive output
29 First port
30 Second port
31 Connecting line
32 Exhaust-gas compressor
33 Exhaust-gas compressor cylinder 34 Exhaust-gas valve
35 Secondary air supply device
36 Secondary air valve
37 Secondary air line
38 Exhaust-gas extraction line
AG Exhaust line
AT Atmosphere
AV Outlet valve
EGR Exhaust-gas recirculation
EV Inlet valve
K Fuel supply
LL Charge-air line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for recovering energy from an exhaust gas of an internal combustion engine, comprising:
    a turbocharger driven by the exhaust gas for generating compressed intake air for the internal combustion engine;
    an air compressor with at least one compression stage, wherein
        the air compressor is connected to an engine intake charge air line arranged to conduct the compressed intake air of the turbocharger into the internal combustion engine for extracting at least a partial quantity of the compressed intake air of the turbocharger out of the engine intake charge air line,
        the partial quantity of the compressed intake air of the turbocharger extracted by the air compressor is adjustable,
        the air compressor is connected to at least one air storage tank for storing compressed air generated by the air compressor,
        the air compressor is reversible to be driven by compressed air stored in the at least one air storage tank, and
        the turbocharger is connected to a secondary air supply device for the controlled supply of at least a partial quantity of compressed stored secondary air to the engine intake charge air line between the turbocharger and the engine in addition to the compressed intake air supplied to the internal combustion engine from the turbocharger,
    the apparatus further comprising:
    an exhaust-gas compressor configured to operate as an air motor,
    wherein
        the exhaust-gas compressor is connected to an exhaust gas line arranged to receive the exhaust gas from the internal combustion engine for extracting at least a partial quantity of the exhaust gas out of the exhaust line, and
        the exhaust-gas compressor is connectable to the internal combustion engine to supply torque to the internal combustion engine.

2. The apparatus as claimed in claim 1, wherein the partial quantity of the compressed intake air of the turbocharger is adjustable as a function of at least one operating parameter of at least one of the internal combustion engine and the turbocharger.

3. The apparatus as claimed in claim 1, wherein the partial quantity of the compressed intake air of the turbocharger is adjustable by a controllable extraction valve.

4. The apparatus as claimed in claim 1, wherein the extractable partial quantity of the compressed intake air of the turbocharger is adjustable by adjusting an intake quantity of the air compressor.

5. The apparatus as claimed in claim 4, wherein the air compressor is drivable in a controllable manner which permits adjustment of the intake quantity.

6. The apparatus as claimed in claim 5, wherein the air compressor is arranged to be coupled to the internal combustion engine.

7. The apparatus as claimed in claim 6, wherein the air compressor has at least one control valve for adjusting the intake quantity.

8. The apparatus as claimed in claim 7, further comprising:
    a control device programmed to control the adjustable partial quantity of the compressed intake air of the turbocharger.

9. The apparatus as claimed in claim 8, wherein the control device is a constituent part of a control unit of the internal combustion engine.

10. The apparatus as claimed in claim 8, wherein the air compressor is an intelligent air compressor coupled to the control device.

11. The apparatus as claimed in claim 1, wherein the exhaust-gas compressor is arranged to be controlled by at least one valve.

12. The apparatus as claimed in claim 11, wherein the exhaust-gas compressor is an intelligent compressor with a control unit integrated therein.

13. An apparatus for recovering energy from the exhaust gas of an internal combustion engine, comprising:
    a turbocharger driven by the exhaust gas for generating compressed intake air for the internal combustion engine; and
    at least one of
        a first air motor drivable by at least one of stored compressed air and compressed intake air of the turbocharger conducted out of an engine intake charge line that receives the compressed intake air of the turbocharger, the first air motor being a reversible air compressor arranged to be coupled to the internal combustion engine for transmission of torque, and
        a second air motor drivable by at least one of stored compressed air and the exhaust gas of the internal combustion engine conducted out of an exhaust line that receives the exhaust gas from the internal combustion engine in order to generate a torque, the second air motor being a reversible exhaust-gas compressor arranged to be coupled to the internal combustion engine for transmission of torque,
    wherein the turbocharger is connected to a secondary air supply device for the controlled supply of at least a partial quantity of compressed stored secondary air to the engine intake charge air line between the turbocharger and the engine.

14. An internal combustion engine having an apparatus for recovering energy from an exhaust gas of an internal combustion engine, comprising:
    at least one engine combustion chamber;
    a turbocharger driven by the exhaust gas emitted from at least one of the at least one engine combustion chambers, the turbocharger generating compressed intake air for the internal combustion engine; and
    an air compressor with at least one compression stage, wherein
- the air compressor is connected to an engine intake charge air line arranged to conduct the compressed intake air of the turbocharger into the internal combustion engine for extracting at least a partial quantity of the compressed intake air of the turbocharger out of the engine intake charge air line,
- the partial quantity of the compressed intake air of the turbocharger extracted by the air compressor is adjustable,
- the air compressor is connected to at least one air storage tank for storing compressed air generated by the air compressor,
- the air compressor is reversible to be driven by compressed air stored in the at least one air storage tank, and
- the turbocharger is connected to a secondary air supply device for the controlled supply of at least a partial quantity of compressed stored secondary air to the engine intake charge air line between the turbocharger and the engine in addition to the compressed intake air supplied to the internal combustion engine from the turbocharger, the apparatus further comprising:
an exhaust-gas compressor operatively configured to operate as an air motor,
wherein
- the exhaust-gas compressor is connected to an exhaust gas line arranged to receive the exhaust gas from the internal combustion engine for extracting at least a partial quantity of the exhaust gas out of the exhaust line, and
- the exhaust-gas compressor is connectable to the internal combustion engine to supply torque to the internal combustion engine.

15. A method for recovering unused energy from exhaust gas of an internal combustion engine having a turbocharger driven by the exhaust gas, comprising the acts of:

compressing intake air with a turbocharger driven by the exhaust gas;

extracting a partial quantity of the intake air compressed by the turbocharger out of an engine intake charge air line between the turbocharger and the internal combustion engine to an air compressor with at least one compressor stage;

further compressing the partial quantity of the intake air compressed by the turbocharger with the air compressor;

storing the further compressed air in at least one air storage tank;

adjusting the partial quantity of the compressed intake air of the turbocharger as a function of at least one operating parameter of at least one of the internal combustion engine and the turbocharger;

generating a torque with at least one of
- driving the air compressor in reverse as a first air motor by at least one of compressed air stored in at least one air storage tank and compressed intake air extracted out of the engine intake charge line from the turbocharger, and
- driving an exhaust gas compressor in reverse as a second air motor by at least one of compressed air stored in the at least one air storage tank and the exhaust gas of the internal combustion engine extracted out of an engine exhaust gas line that receives the exhaust gas from the internal combustion engine; and transmitting the torque to the internal combustion engine via at least one controllable clutch, wherein the turbocharger is connected to a secondary air supply device for the controlled supply of at least a partial quantity of compressed stored secondary air to the engine intake charge air line between the turbocharger and the engine.

\* \* \* \* \*